June 18, 1968 A. F. McLEAN 3,388,778

CONTROL APPARATUS FOR A GAS TURBINE ENGINE

Filed Nov. 14, 1966 2 Sheets-Sheet 1

June 18, 1968      A. F. McLEAN      3,388,778
CONTROL APPARATUS FOR A GAS TURBINE ENGINE
Filed Nov. 14, 1966      2 Sheets-Sheet 2

ARTHUR F. McLEAN
INVENTOR

BY John R. Faulkner
Robert E. McCollum
ATTORNEYS

United States Patent Office 3,388,778
Patented June 18, 1968

3,388,778
CONTROL APPARATUS FOR A GAS
TURBINE ENGINE
Arthur F. McLean, Livonia, Mich., assignor to Ford
Motor Company, Dearborn, Mich., a corporation of
Delaware
Filed Nov. 14, 1966, Ser. No. 594,117
7 Claims. (Cl. 192—.049)

This invention relates, in general, to a fluid pressure control system, and, more particularly, to a control system for a gas turbine engine that is installed in a motor vehicle.

The invention relates primarily to a speed synchronizing control that permits the use of a manually operated or non-automatic transmission with a gas turbine engine to drive a motor vehicle. More particularly, it relates to an engine-transmission clutch synchronizing control that automatically brakes the engine power output shaft to the speed of the transmission power input shaft when the conventional vehicle clutch pedal is depressed, so that a synchronized gear ratio change can be made.

Motor vehicle type gas turbine engines generally provide for a change in the engine output speed by changing the pitch of the adjustable power turbine nozzles as well as by controlling the fuel supply. The adjustability of the nozzles, therefore, is used as a control for the various acceleration, deceleration and braking operations of the turbine.

The use of a manually operated transmission with a gas turbine engine necessarily involves the use of a disengageable clutch between the engine and the transmission so that the transmission can be disconnected from the engine prior to a different gear ratio drive being established. However, unless the operator is skilled in synchronizing the speeds of the drive and driven clutch plates, changing gear ratios can be noisy and difficult.

The invention, therefore, is concerned primarily with the provision of control means to regulate the engine output shaft speed, by adjusting the turbine nozzles to a braking position, when the conventional clutch pedal is depressed, to obtain a synchronized shift, while at the same time preventing engine runaway when the load is released from the engine output shaft.

Therefore, it is a primary object of this invention to provide a gas turbine engine-manually operated transmission power pack with means that is operated automatically upon the operator disengaging the conventional engine-transmission clutch to synchronize the speeds of the engine output and transmission power input shafts.

It is a further object of the invention to provide a synchronizing means of the type described above consisting a fluid pressure governor mechanism sensitive to the speed differential between the engine output and transmission input shafts to effect a variable adjustment of the gas turbine engine power turbine nozzles to positions braking the engine output shaft to the speed of the transmission input shaft.

It is also an object of the invention to provide a turbine nozzle pitch adjusting mechanism that will at times automatically control the attitude of the nozzles as a function of the position of the conventional engine-transmission clutch pedal.

Other objects, features and advantages of the invention will become apparent upon reference to the succeeding detailed description thereof, and to the drawings illustrating the preferred embodiments thereof; wherein, FIGURE 1 is a partial cross-sectional view, of a gas turbine engine turbine nozzle control embodying the invention;

Figure 1:
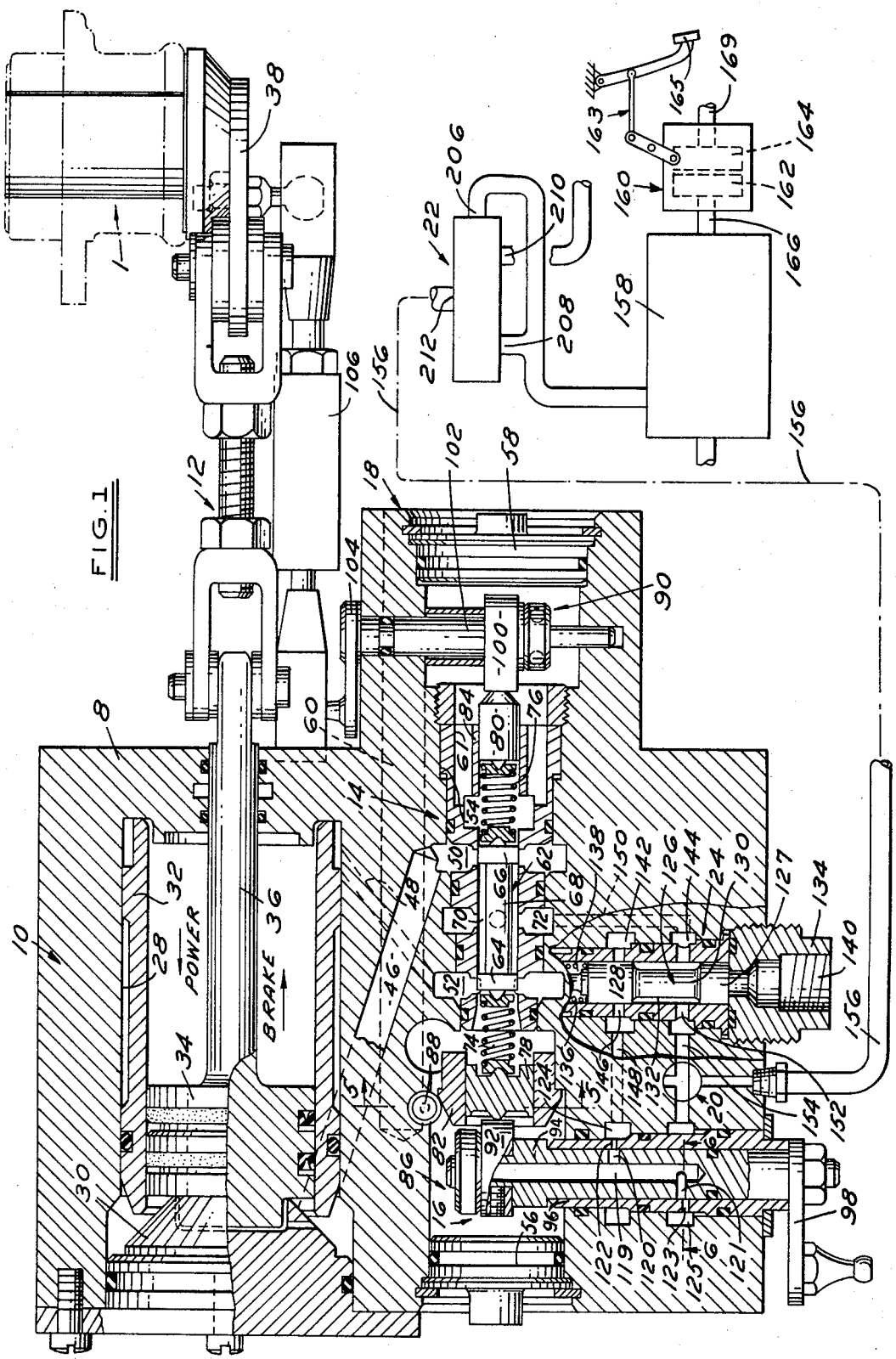
Figure 4:
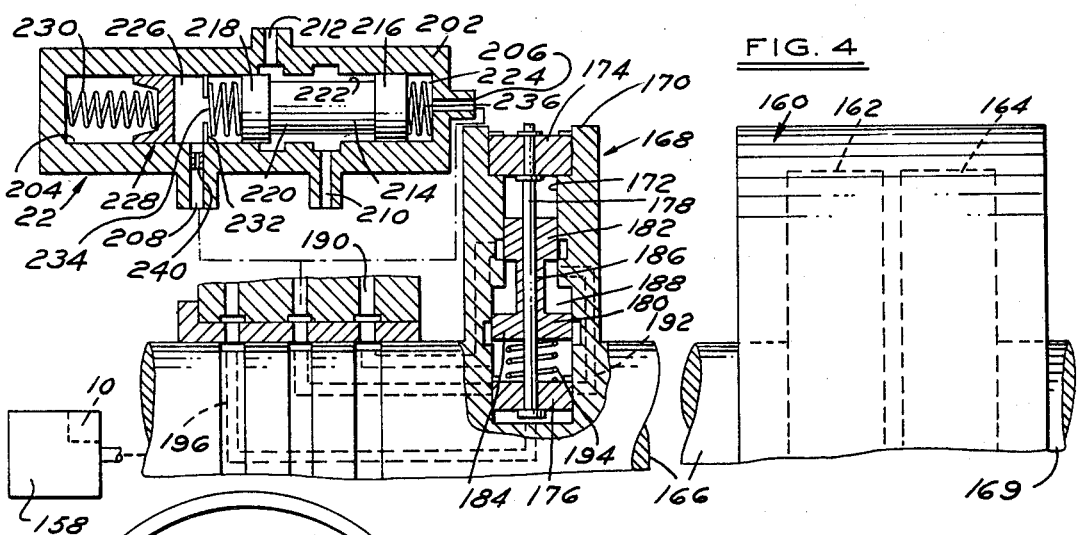
FIGURE 4 is an enlarged cross-sectional view of a portion of FIGURE 1.
Figure 7:
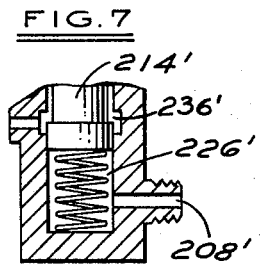
Figures 5, 6:
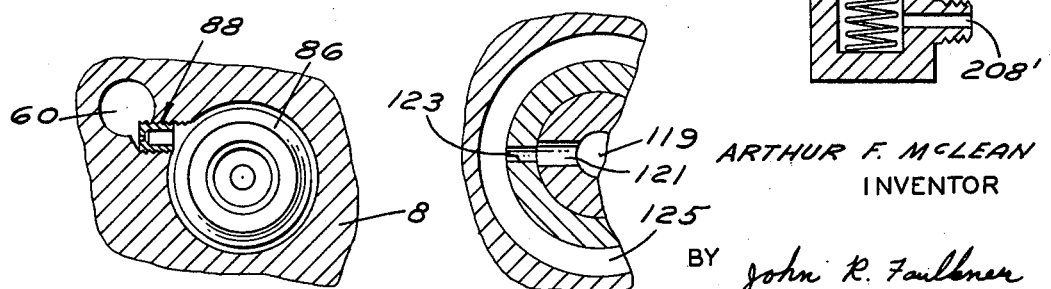

FIGURES 5 and 6 are cross-sectional views of details taken on planes indicated by and viewed in the direction of arrows 5—5 and 6—6, respectively, of FIGURE 1; and FIGURE 7 is a schematic cross-sectional view of a modification of the FIGURE 4 construction.

FIGURE 1 shows one view of a portion of a turbine nozzle control that embodies the invention. The details of construction and operation of the particular nozzle control shown, together with other associated control devices, not shown, are fully shown and described in my copending application U.S. Ser. No. 515,356, filed Dec. 21, 1965, entitled, Turbine Nozzle Actuator, having a common assignee. They are repeated here only to the extent necessary for a complete understanding of the clutch plate speed synchronizing control of this invention.

The nozzle control would be secured as an accessory to the housing of a gas turbine engine (not shown). The details of the engine are not given since they are known and are believed to be unnecessary for an understanding of the invention. Suffice it to say that the engine would have one or more compressor and power turbines, and that the stationary power turbine nozzles indicated schematically at 1 would be positioned between the usual diffuser section and power turbine rotor blades 2 (FIGURE 2) to control the direction of discharge of combustion product gases to effect the desired rotation of the turbine rotor or rotors.

Figure 2:
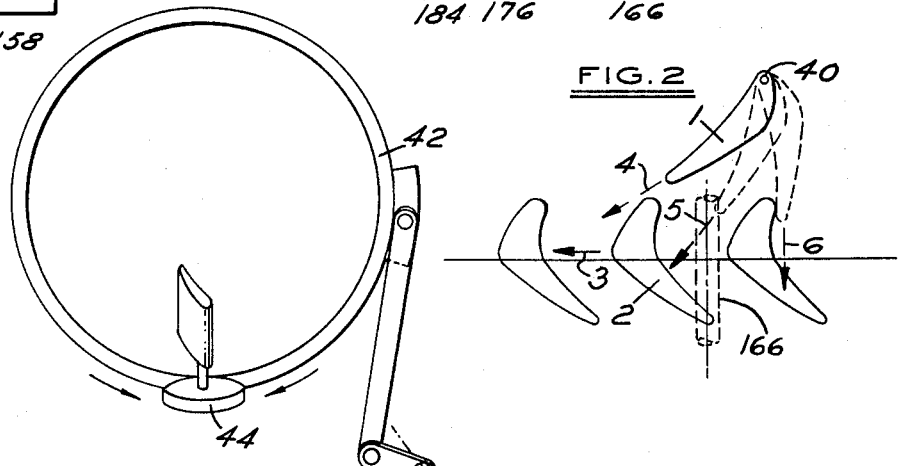
FIGURE 2 is a schematic cross-sectional view of a turbine nozzle and turbine blade.

FIGURE 2 shows, schematically, the cooperation between a typical turbine nozzle 1 and an axial flow turbine blade 2, the latter being fixedly mounted on a power output shaft 166 indicated in dotted lines, and also shown in FIGURE 4. The range of movement of the nozzle for rotation and acceleration of turbine blade 2 in the direction of arrow 3 is indicated in general by dotted lines 4 and 5. When the nozzle moves between these positions, the gas will discharge against the back side of turbine blade 2 and thus rotate it forwardly.

During the initial accelerating phase of the motor vehicle, the nozzles 1 will be moved clockwise progressively towards the full line position 4 as a function of the position of the vehicle accelerator pedal to provide rotation of the turbine and engine output shaft as called for. On the other hand, if the vehicle operator releases the accelerator pedal, such as, for example, during vehicle deceleration or engine idle speed operation, or depresses the conventional clutch pedal, the nozzles 1 will be pivoted backwards progressively toward the dotted line braking position 6 to change the direction of discharge of the gases from the nozzles to strike the front portions of the turbine blades to thereby retard rotation of the rotor blades 2 in the forward direction. Retarding the power turbine rotation will, of course, retard the engine output shaft rotation since they normally are interconnected by suitable reduction gearing, not shown.

More specifically, the control system includes, in general, a combined housing and valve body 8; servo mechanism 10 that is operatively connected by suitable push-pull type linkage 12 to the turbine nozzles 1; a shuttle valve mechanism 14 that controls the flow of fluid to operate servo mechanism 10; an accelerator pedal rotated throttle valve member 16 for controlling the movement of shuttle valve mechanism 14; a power feedback mechanism 18 for re-arming the shuttle valve mechanism by returning it to a neutral position when the nozzles move to the position selected; an operator-controlled transmission selector control valve 20 for effecting rotation of the nozzles to brake the power turbine when the vehicle transmission is disconnected from the engine, that is, the conventional clutch pedal is depressed, and controls for braking the engine output shaft at times, namely, an engine-transmission shafts speed sensitive synchronizing assembly 22, and a vehicle speed sensitive valve 24.

Figure 3:
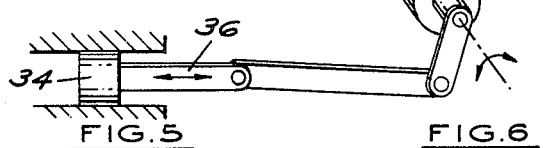
FIGURE 3 is a schematic illustration of a turbine nozzle control assembly.

Servo mechanism 10 includes a stepped diameter cylindrical bore 28 closed at one end by a conically shaped cap 30 that abuts and locates a cylindrical sleeve 32. The sleeve encloses an annular piston 34 having an actuating rod 36 that projects through housing 8 to a connection with linkage means 12. The linkage in this particular case, as best seen in FIGURE 1, rotates a lever 38 that is fixed in a suitable manner to turbine nozzle 1 to rotate it about its pivot point 40 (FIGURE 2). In practice, the nozzles would all rotate as a unit, in a manner similar to that shown in FIGURE 3; that is, the piston rod would rotate a ring gear 42 in mesh with a gear 44 secured to each nozzle.

Piston 34 is reciprocated in opposite directions by alternately admitting fluid under pressure to opposite ends of the bore of sleeve 32 through suitable passages 46 and 48. These latter passages are connected to a pair of annular fluid manifolds 50 and 52 that are controlled by shuttle valve mechanism 14.

The shuttle valve mechanism is mounted in a stepped diameter bore 54 that is closed at opposite ends by caps 56 and 58. The bore has a main drain passage 60 connected to a sump, not shown. The bore also has a sleeve member 61 that slidably and sealingly supports a spool valve 62. The spool valve is of a known type having spaced lands 64 and 66 interconnected by a neck portion 68 to define a fluid annulus 70. The annulus is connected at all times to an annular fluid pressure supply passage 72 that is supplied with fluid under pressure from any suitable source, not shown, whenever the engine compressor is driven.

Spool valve 62 is normally positioned in a central or neutral position blocking flow of fluid from passage 72 to either of the servo passages 46 and 48. The shuttle valve is urged towards this position by a pair of centering springs 74 and 76 that are seated against cam followers 78 and 80. The cam followers are slidably mounted within suitable sleeves 82 and 84 non-movably fixed in the valve body.

The bore 54, cap 56, sleeve 82 and left-hand cam follower 78 together define a fluid chamber 86. The chamber is essentially closed except for controlled orifice connection 88 (see FIGURE 5) to main drain passage 60, for a purpose to be described later. Right-hand cam follower 80, together with bore 54, sleeve 61 and cap 58, form a second chamber 90 that is connected at all times to drain passage 60.

Left-hand cam follower 78 abuts against the profiled surface of a cam 92 that is fixed for rotation with the throttle valve member 16. This member projects into fluid chamber 86 and includes a shaft 94 that is rotatably mounted within a sleeve 96 fixed within housing 8. Shaft 94 is connected at its opposite end to a lever 98 that is adapted to be connected to the conventional motor vehicle accelerator pedal linkage (not shown) so that movement of the accelerator pedal will swing lever 98 by a proportionate amount.

The right-hand cam follower 80 abuts against the profiled surface of a cam 100 that is fixed for rotation with a power feedback control shaft 102. This shaft, at its opposite end, is suitably connected by a lever 104 and push-pull linkage 106 to the radially inner portion of lever 38 that is rotatable with the turbine nozzles 1. This construction transmits the nozzle rotation back through cam 100 to shuttle valve 62 to return it to its neutral position to maintain the piston 34 in the position selected by the position of throttle valve member cam 92.

With the construction as thus far described, the valve assembly will provide for accelerating and decelerating positions of nozzles 1 in accordance with the movement of the vehicle accelerator pedal and rotation of throttle valve member 16.

Consider now the control to brake the turbine and thereby indirectly retard creep of the vehicle during engine idle speed operation, when the transmission is engaged for a drive condition. Throttle member shaft 94 has a central bore 119 that is open at one end to chamber 86, and has restricted crossbores 120 and 121 of different sizes. The bores 120 and 121 are adapted to cooperate with different size orifices 122 and 123 in sleeve 96 that are connected at all times to annular fluid manifolds 124 and 125. As best seen in FIGURE 6, the crossbores of shaft 94 are so arranged that when the shaft is rotated by the vehicle accelerator pedal to the engine idle speed position shown in FIGURE 6, the shaft crossbores 120 and 121 will be aligned with the flow restricting orifices 122 and 123. Thus, any fluid under pressure in the manifolds 124 and 125 will have a controlled flow into the central bore 119 and out into chamber 86 to pressurize the chamber and move cam follower 82 away from cam 92. The degree of pressurization of chamber 86 will, of course, depend upon the size of the drain orifice 83, and whether both manifolds 124 and 125 contain fluid, or just one.

The supply of fluid to manifolds 124 and 125 is controlled by the vehicle speed sensitive valve mechanism 24, a transmission clutch pedal operated valve 20, and the clutch plate speed synchronizing valve assembly 22.

Valve mechanism 24 includes a spool valve 126 slidably mounted within a sleeve fixed in the valve body or housing 8. The spool valve has spaced lands 127 and 128 interconnected by a neck portion 130 defining an annular fluid chamber 132. The valve is biased to the position shown against an adapter plug 134 by a spring 136, the chamber 138 containing the spring being vented to exhaust through a port, not shown. The opposite end of the valve is adapted to be moved upwardly by fluid under pressure admitted through a passage 140 from a vehicle output shaft speed sensitive source of fluid under pressure (not shown) that develops a pressure that changes with changes in vehicle speed.

The valve body for valve 126 has annular manifolds 142 and 144. Manifold 142 is connected by ports 146 to the valve bore and by a passage 148 to throttle valve manifold 124. Manifold 144 is connected by a passage 150 to main fluid supply passage 72 and by ports 152 to the valve bore. Manifold 144 is also connected by passage 154 past selector lever control valve 20 to throttle valve manifold 125.

In the position shown, valve 126 connects fluid under pressure from line 150 directly to throttle member manifold 125, when valve 20 is in the position shown. When the vehicle output shaft speed is above a predetermined value, the pressure in line 140 raises valve 126 so that fluid will also flow through passage 148 to the throttle valve manifold 124.

Valve 20 provides the transmission clutch pedal control of the nozzle position. This valve has a 90° rotation between two positions permitting flow to throttle valve member manifold 125 either from the vehicle speed sensitive valve 126 through line 154, or from the engine-transmission shafts speed synchronizing valve assembly 22 through a line 156. Valve 20 would be connected by suitable linkage to the conventional vehicle clutch pedal that is normally provided when a manually operated or non-automatic type transmission is used. Depressing the clutch pedal to brake the driveline between the engine and transmission would rotate valve 20 counterclockwise 90° to connect the throttle valve manifold 118 to line 156. The linkage connection between valve 20 and the clutch pedal would be similar to that fully shown and described in my copending application U.S. Ser. No. 519,823, entitled, Vehicle Accelerator Pedal-Transmission Selector Lever Interconnecting Linkage, filed Nov. 3, 1966, and having a common assignee.

The clutch synchronizing mechanism 22 is shown in more detail in FIGURE 4.

The gas turbine engine as a whole, together with the nozzle actuator 10 shown in FIGURE 1, are represented schematically by the blocks 158 and 10. The manually disengaged clutch that is conventionally positioned between an engine and a nonautomatic transmission is represented in this case by the block 160.

The details of construction and operation of clutch 160 are not shown since they are known and believed to be unnecessary for an understanding of the invention. Suffice it to say that the clutch would include a driving clutch plate 162 fixedly secured to engine power output shaft 166 and cooperating with an axially movable clutch plate 164 secured to the transmission power input shaft 165. The clutch would be of the spring engaged type. Driven plate 164 would be slidable axially to the position shown, out of engagement with driving clutch plate 162, by linkage represented schematically at 163, when the conventional clutch pedal 165 is depressed. This would break the powerflow path through the clutch between the engine and transmission.

Engine power output shaft 166 mounts a centrifugally responsive speed signal generator 168 that provides a fluid pressure speed signal that is a direct measure of engine output shaft r.p.m. More specifically, an annular housing 170 is secured to shaft 166 and extends substantially at right angles to it. The housing has a stepped diameter bore 172 closed at opposite ends by a pair of members 174 and 176 interconnected by a stem 178. Slidable on stem 178 is a spool valve-type weight member 180 having a pair of different diameter lands 182 and 184 interconnected by a reduced diameter neck portion 186. The lands, neck portion and bore walls together define an annular fluid pressure chamber 188 that is connected to a main fluid pressure supply through a line 190 and to an outlet signal pressure force line 192. The valve is normally biased upwardly by a spring 194 to admit fluid under pressure from line 190 to the chamber 188, which then moves the valve downwardly to a position closing off line 190. The opposite end chambers of the valve are vented to exhaust through a return line 196 connected in a suitable manner to a drain passage.

Control of communication between lines 190 and 192 is provided by the axial movement of upper land 182 in response to a differential between the spring plus centrifugal force, acting on the rotating mass of the valve to raise it, and the fluid pressure in line 190, admitted to chamber 188 and acting downwardly on the differential area between lands 182 and 184.

In operation, rotation of engine shaft 166 will cause a progressive outward movement of weight 180 in response to centrifugal force acting on it. As the valve moves outwardly, line 190 is progressively cracked open to valve chamber 188, resulting in an increase in pressure in this chamber until the valve reaches a centrifugal force-fluid pressure balanced equilibrium position for the particular speed of shaft 166. For this particular speed, therefore, a given signal pressure in line 192 will exist. It will be clear, therefore, that the speed signal generator 168 will provide a signal pressure force that is a direct measure of the speed of rotation of output shaft 166, rising and falling in proportion to the change in speed of the shaft.

The signal pressure force in line 192 provides the main control to a governor valve assembly indicated in general at 200. This assembly includes a valve body 202 having a bore 204. The valve body has first and second inlets 206 and 208, each of which are connected directly to fluid pressure signal line 192. A third inlet 210 is connected to a branch of the supply line 190; alternately, it could be connected to a separate source of fluid under pressure, not shown. The valve body also contains a fluid pressure outlet 212 that is connected by line 156 to valve 20 shown in FIGURE 1.

Communication between supply line 210 and outlet 212 is controlled by a spool valve 214 that is slidably received within bore 204. Valve 214 has a pair of equal diameter spaced lands 216 and 218 connected by a neck portion 220. The lands and neck portion divide the bore into three fluid pressure chambers 222, 224 and 226. The chamber 226 is further subdivided into two chambers by the piston 228 of a fluid pressure accumulator. The piston is slidably and sealingly mounted in the bore 204 and biased upwardly by a suitably pre-loaded spring 230. The accumulator minimizes sudden pressure fluctuations in chamber 226 due to intermittent pressure drops in line 208. An apertured stop plate 232 limits the upward movement of the piston 228 and also serves as a seat for a spring 234 providing an upward biasing force on valve 214. An equal force spring 236 in chamber 224 biases the valve in the opposite downward direction, so that when the fluid forces in chambers 224 and 226 are equal, the valve land 218 will shut off outlet 212.

The inlet 208 contains a flow restricting orifice 240 of fixed area for providing an initial delay in the change in the pressure of the fluid in chamber 226 when the pressure in signal line 192 changes due to a change in the speed of rotation of output shaft 166. The purpose of this orifice is to render chamber 226 a memory pressure chamber. Its function will be understood more clearly by a consideration of the over-all operation of the synchronizing assembly.

Assume that the transmission clutch pedal is released so that the clutch driving and driven plate members 162 and 164 are engaged and rotate at the speed of shaft 166. The fluid pressure level in chambers 224 and 226 will then be the same, and valve 214 will be in a position closing outlet 212.

Assume now that clutch pedal 165 is depressed to disengage the clutch preparatory to making a gear ratio change in the transmission. The immediate decrease in load on the engine driven clutch plate 162 permits output shaft 166 to speed up to a higher r.p.m. This causes a corresponding increase in the pressure in signal pressure line 192, which is immediately reflected in the governor valve inlets 206 and 208. The pressure in chamber 236 will then immediately increase. The orifice 240 delays an immediate increase in the pressure in chamber 226, thereby permitting the pressure in chamber 236 to move valve 214 downwardly and increase the pressure in outlet 212 and line 156.

Since depression of the clutch pedal has rotated selector valve 20 (FIGURE 1) 90° counterclockwise, this increased pressure immediately acts on the turbine nozzle braking servo and causes a braking action on output shaft 166. This, of course, reduces the speed of shaft 166 and reduces the pressure in signal line 192 connected to governor valve inlets 206 and 208.

It will be clear, therefore, that a progressive decrease will occur in the speed of shaft 166 simultaneously with the progressive increase in the fluid pressure in chamber 234 so that output shaft 166 will be reduced to the speed of driven clutch plate 164. This then permits the movement of the transmission gear ratio selector lever to establish a particular gear ratio without clashing of the gears, etc.

It will be seen, therefore, that governor valve fluid pressure chamber 226 constitutes, in effect, a memory pressure chamber that reflects the initial speed of the transmission power input shaft prior to de-clutching, while the pressure in chamber 236 reflects the speed of the engine output shaft after de-clutching. Thus, the synchronizing assembly provides for an immediate synchronization of the speeds of the engine output and transmission input shafts when clutch pedal 165 is depressed.

FIGURE 7 shows a modification of the FIGURE 4 embodiment. In this case, a speed signal generator similar to the one shown at 168 in FIGURE 4 would also be attached to the transmission power input shaft driven plate 164 so as to provide a fluid pressure signal force varying in proportion to the speed of the transmission input shaft in the same manner as that provided by speed signal generator 168. The fluid pressure output from the transmission speed signal generator would be connected directly to inlet 208' shown in FIGURE 7, which connects directly to chamber 226' beneath governor valve 214'. Orifice 240, shown in FIGURE 4, in this case, is unnecessary since chamber 226' will directly reflect the speed of the driven clutch plate assembly.

In the FIGURE 7 embodiment, therefore, it will be seen that valve 214' is acted upon differentially by two different pressure fluid signals in chambers 236' and 226', which are each responsive, respectively, to the drive and driven speed signal generators. Thus, when the clutch is disengaged, the sudden rise in speed of shaft 166 forces valve 214' downwardly to increase the pressure to the turbine nozzle braking servo which then lowers progressively the speed of the engine output shaft until it is at the same speed as the power input shaft. Thus, a synchronized gear shift can be made.

The over-all operation of the nozzle control is as follows: When the engine is inoperative, the nozzles 1 will be somewhere in the turbine braking range since the accelerator pedal will have been released, and one or more of the controls described will have increased the pressure in chamber 86 sufficiently to cause piston 34 to rotate the nozzles to this position. Assume, therefore, that the vehicle is standing still, the accelerator pedal is released, and the clutch pedal is in a released or clutch engaged position. Vehicle speed responsive valve 126 and valve 20 will be in the positions shown in FIGURE 1; therefore, there will be a flow of fluid from valve 126 through valve 16 into chamber 86. This moves cam follower 78 and shuttle valve 62 to the right, admitting fluid from port 72 to servo passage 46. Piston 34 thus is urged to the right to rotate the nozzles 1 towards a greater turbine braking position, which will reduce the engine output shaft speed and close the cycle.

Assume now that the operator depresses the clutch pedal preparatory to moving the transmission selector lever to a gear ratio establishing position. This moves valve 20 counterclockwise 90° and connects the fluid under pressure in line 156 to the throttle valve shaft bore 119 through orifice 123 and port 121. Fluid will then pressurize chamber 86 a predetermined amount dependent upon the pressure of the fluid in line 156, which changes with changes in the relative speeds between the input and output parts of clutch 160 in the manner already described. The engine output shaft 66 will then be braked to the speed of the transmission input shaft.

If the operator now moves the selector lever to a gear engaging position, re-engages clutch 160, and depresses the accelerator pedal, all communication of fluid to chamber 86 is immediately cut off, thus permitting the chamber to be drained through orifice 88 and relieve the pressure build-up against cam follower 78. The progressive or quick depression of the accelerator pedal now rotates throttle shaft 94 and cam 92 to relieve the pressure on cam follower 78 and spring 74 and permit opposite centering spring 76 to move shuttle valve 62 to the left. This opens servo passage 48 to supply port 72, while connecting servo line 46 to drain line 60 through the right end chamber 90.

Piston 34 thus moves progressively to the left and rotates nozzles 1 to their closed, turbine accelerating positions 5 and 4. As the nozzles rotate, the feedback exerted through linkage 106, 104 and shaft 102 rotates cam 100 to relieve the force on cam follower 80 and spring 76. The shuttle valve 62 thus begins to move back towards a neutral position under the influence of spring 74. The fluid supply to servo passage 48 thus is progressively cut off and finally terminated when the nozzles 1 have reached the accelerating position corresponding to the degree of depression of the accelerator pedal and rotation of throttle control member cam 92.

It will be clear that if the driver should partially release the accelerator pedal, that rotation of cam 92 in the opposite decelerating direction will cause a reverse operation of the shuttle valve mechanism. That is, shuttle valve 62 will be moved to the right to connect supply port 72 and servo passage 46 so that piston 34 will be moved to actuate the nozzles to a lesser accelerating position, depending upon the new position of the accelerator pedal.

If, after the vehicle has been accelerated, the operator should completely release the accelerator pedal to its idle speed position, both orifices 122 and 123 in throttle valve shaft 94 are opened to control passages 148 and 154. If the vehicle speed is above a predetermined value, valve 126 will have been moved upwardly by the speed sensitive fluid pressure in line 140 so that fluid under pressure in line 150 now is supplied through both lines 148 and 154, thereby pressurizing chamber 86 to a high value. This moves cam follower 78 and shuttle valve 62 to the right causing piston 34 to move in a rightward direction to actuate the nozzles 1 to their maximum turbine braking positions.

If, at the same time, the clutch pedal is depressed, valve 20 would be moved 90° to the left. Supply of braking pressure to the throttle member manifold 125 from valve 126 through line 154 would be cut off; however, manifold 125 would now be supplied from line 156. The engine output shaft would then again be braked.

From the foregoing, it will be seen that the invention provides means to establish a synchronized shift when a manually operated transmission is used with a gas turbine engine, and that the use of the synchronizing assembly makes possible the use of a manually operated transmission with a gas turbine engine since it immediately reduces the engine output shaft speed to that of the transmission input shaft speed when the clutch is disengaged.

While the invention has been shown and described in its preferred embodiments, it will be clear to those skilled in the arts to which it pertains that many changes and modifications may be made thereto without departing from the scope of the invention.

I claim:

1. A multi-shaft speed control for synchronizing the speeds of rotation of a transmission power input shaft and a gas turbine engine power output shaft coupled to said transmission, said output shaft being operably connected to and driven by a power output turbine of said engine, comprising, clutch means normally operable to couple said shafts for unitary rotation and movable to an inoperable position uncoupling said shafts, operator controlled clutch pedal means movable between first and second positions for rendering said clutch means operable or inoperable, braking means operably associated with said turbine when operable braking rotation of said turbine and power output shaft, speed responsive force generating means connected to said output shaft providing an actuating force that changes as a function of the change in speed of said output shaft, movable control means operbly connecting said force to said braking means for rendering said braking means operable to brake said output shaft, means connecting said clutch pedal means and said movable control means for movement of said movable means by said clutch pedal means between first and second positions corresponding to said first and second positions of said clutch pedal means, said first and second positions blocking or permitting respectively, application of said force to said braking means, and force regulating means between and connected to said force generating and movable control means operably acted upon by said force for regulating the value of said force acting on said brake means as a function of the differential in speeds of said output shaft when coupled or uncoupled from said input shaft.

2. A speed control as in claim 1, said force regulating means comprising a fluid pressure regulating valve, said force generating means comprising a fluid pressure signal generator, means connecting said fluid signal pressure to opposite portions of said valve, and further means associated with one of said portions to delay the application of said signal pressure to said portion upon change in said pressure resulting from a change in speed of said output shaft to effect a pressure differential force on said valve whereby said valve is moved to a new pressure regulating position changing the pressure to said braking means.

3. A speed control as in claim 2, said further means comprising flow restricting orifice means.

4. A speed control as in claim 3, said signal generator comprising a centrifugally responsive fluid pressure governor having an output pressure that varies in direct proportion to the speed of rotation of said output shaft.

5. A multi-shaft speed synchronizing assembly for synchronizing the speed of a gas turbine engine power output shaft to that of a transmission power input shaft, when said shafts are disconnected preparatory to establishing a gear-ratio change in said transmission, said output shaft being operably connected to and driven by a power output turbine of said engine, said shafts being connected by an operator disengageable clutch means, comprising, braking means operably connected to said output shaft and turbine, speed signal generating means secured to said output shaft for rotation therewith providing a speed signal that increases as a function of the increase in speed of said output shaft, actuating means connected to said braking means, and movable control regulating means operably acting on said actuating means to regulate the degree of actuation of said braking means by said actuating means, said control means including differential force movable means movable by application of said signal to opposite portions thereof, one of said portions having means momentarily retarding application of said signal thereto upon a change in said signal to both said opposite portions to thereby effect an initial movement of said movable means.

6. A synchronizing assembly for use in a motor vehicle having a gas turbine engine coupled by clutch means to a transmission, comprising, in combination, a gas turbine engine having a turbine coupled to and driving a power output shaft, a transmission power input shaft, a spring released, depressible clutch pedal, disengageable clutch means operably connecting said shafts, means operably connecting said pedal to said clutch means whereby depression of said pedal disengages said clutch means and release of said pedal re-engages said clutch means, a centrifugally responsive fluid pressure signal generator secured for rotation with said output shaft, said engine having a power turbine gas inlet control nozzle rotatable between output shaft braking and non-braking positions, means to rotate said nozzle, a source of actuating fluid under pressure, and conduit means operably connecting said actuating fluid to said nozzle rotating means, said conduit means including a movable on-off valve means between said source and said nozzle rotating means operably connected to said clutch pedal for opening or blocking said conduit means in response to depression or release, respectively, of said pedal, said conduit means also including fluid pressure regulating valve means variably movable from an initial position variably across said conduit means to vary the flow from said source to said nozzle rotating means, means connecting the fluid signal from said generator to opposite portions of said valve means for movement of said valve means in opposite directions opening or restricting flow from said source, and flow restricting means associated with one portion of said valve means initially delaying an increase in signal pressure against the associated portion upon an increase in signal pressure to both portions whereby said valve means is moved to increase the fluid flow to said nozzle rotating means upon depression of said clutch pedal to rotate said nozzle to an output shaft braking position, the reduction in speed of said output shaft effecting a repositioning of said valve means to its initial position.

7. An assembly as in claim 6, said valve means comprising a regulating valve reciprocatable in a valve body bore and having spaced interconnected lands defining a first fluid chamber between adjacent positions of said lands, and second and third fluid chambers between the ends of said valve and said bore, said first chamber having an inlet through said valve body to said source and an outlet through said valve body to said conduit means, said second and third chambers having inlets through said valve body to said signal, said flow restricting means comprising an orifice in said third chamber inlet, an increase in the signal providing an initial differential pressure force between the fluid in said second and third chambers to effect movement of said regulating valve to a position increasing fluid under pressure to said nozzle rotating means.

References Cited
UNITED STATES PATENTS

| | | | |
|---|---|---|---|
| 1,927,209 | 9/1933 | Gilmore | 192—.049 |
| 2,277,584 | 3/1942 | Freeman | 192—.049 |
| 3,025,036 | 3/1962 | Kumm et al. | 253—78 |
| 3,168,810 | 2/1965 | Gatzemeyer et al. | 60—39.25 XR |
| 3,211,424 | 10/1965 | Lewakowski | 60—39.25 XR |
| 3,348,806 | 10/1967 | Swiecki | 253—59 |

CARLTON R. CROYLE, *Primary Examiner.*

C. B. LEEDOM, *Assistant Examiner.*